US012617138B2

(12) United States Patent
Ando

(10) Patent No.: US 12,617,138 B2
(45) Date of Patent: May 5, 2026

(54) INJECTION MOLDING MACHINE WITH CONTROLLER FOR DIAGNOSING INJECTION MOLDING MACHINE

(71) Applicant: THE JAPAN STEEL WORKS, LTD., Tokyo (JP)

(72) Inventor: Kotone Ando, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 110 days.

(21) Appl. No.: 18/401,411

(22) Filed: Dec. 30, 2023

(65) Prior Publication Data

US 2024/0246274 A1 Jul. 25, 2024

(30) Foreign Application Priority Data

Jan. 25, 2023 (JP) ................................ 2023-009165

(51) Int. Cl.
B29C 45/76 (2006.01)
B29C 45/50 (2006.01)
(Continued)

(52) U.S. Cl.
CPC .......... B29C 45/76 (2013.01); B29C 45/5008 (2013.01); B29C 45/768 (2013.01); *B29C 2045/1792* (2013.01); *B29C 2045/5052* (2013.01); *B29C 2945/76036* (2013.01); *B29C 2945/76163* (2013.01); *B29C 2945/76187* (2013.01); *B29C 2945/76214* (2013.01); *B29C 2945/7623* (2013.01); *B29C 2945/76234* (2013.01); *B29C 2945/76451* (2013.01); *B29C*

*2945/76939* (2013.01); *B29C 2945/76949* (2013.01); *B29C 2945/76983* (2013.01); *G01M 13/028* (2013.01)

(58) Field of Classification Search
CPC ...................................................... B29C 45/03
See application file for complete search history.

(56) References Cited

U.S. PATENT DOCUMENTS 4,615,669 A * 10/1986 Fujita .................. B29C 45/5008
425/157
6,340,439 B1 * 1/2002 Hiraoka .................. B29C 45/47
264/40.5

(Continued)

FOREIGN PATENT DOCUMENTS

| CN | 114829035 A | | 7/2022 |
| JP | 2007196391 A | * | 8/2007 |

(Continued)

OTHER PUBLICATIONS

Machine Translation of WO 2021157264 A1, Aug. 2021 (Year: 2021).*

(Continued)

*Primary Examiner* — Benjamin A Schiffman
(74) *Attorney, Agent, or Firm* — Potomac Law Group, PLLC

(57) ABSTRACT

A vibration sensor detects first data of a first component group and second data of a second component group. An injection molding machine performs diagnosis processing for diagnosing the first component group based on the first data in an injection mode and performs diagnosis processing for diagnosing the second component group based on the second data in a plasticization mode.

15 Claims, 9 Drawing Sheets

(51) Int. Cl.
G01M 13/028 (2019.01)
B29C 45/17 (2006.01)

(56) References Cited

U.S. PATENT DOCUMENTS

| | | | | |
|---|---|---|---|---|
| 6,761,552 | B2 * | 7/2004 | Fujita | B29C 45/76 425/149 |
| 8,119,044 | B1 * | 2/2012 | Akasaka | B29C 45/76 264/40.7 |
| 11,999,085 | B2 * | 6/2024 | Fukuda | B29C 45/661 |
| 12,083,726 | B2 * | 9/2024 | Hihara | B29C 45/76 |
| 12,350,872 | B2 * | 7/2025 | Ochiiwa | B29C 45/7666 |
| 2022/0347905 | A1 | 11/2022 | Hihara et al. | |
| 2022/0402184 | A1 | 12/2022 | Ochiiwa et al. | |
| 2023/0382034 | A1 * | 11/2023 | Yufu | B29C 45/7666 |
| 2024/0198572 | A1 * | 6/2024 | Okawachi | B29C 45/2602 |
| 2025/0114990 | A1 * | 4/2025 | Kosue | B29C 45/1774 |
| 2025/0121545 | A1 * | 4/2025 | Hanayama | B29C 45/762 |

FOREIGN PATENT DOCUMENTS

| | | | | | |
|---|---|---|---|---|---|
| JP | 4364828 | B2 * | 11/2009 | | B29C 45/76 |
| JP | 2014104752 | A * | 6/2014 | | B29C 45/84 |
| JP | 2017039235 | A * | 2/2017 | | |
| JP | 2021-074917 | A | 5/2021 | | |
| WO | WO-2008035630 | A1 * | 3/2008 | | B29C 45/7626 |
| WO | WO-2021090765 | A1 * | 5/2021 | | B29C 45/768 |
| WO | WO-2021090766 | A1 * | 5/2021 | | B29C 45/7666 |
| WO | WO-2021157264 | A1 * | 8/2021 | | B29C 45/1866 |

OTHER PUBLICATIONS

Extended European Search Report and European Search Opinion issued May 28, 2024, in European Patent Application No. 24153650.7.

* cited by examiner

FIG.3

COMPONENT TO BE DIAGNOSED IN EACH MODE

| MODE | DIAGNOSED COMPONENT |
|---|---|
| INJECTION MODE (FIRST MODE) | FIRST COMPONENT GROUP<br>・BALL SCREW NUT<br>・BALL SCREW<br>・FIRST BEARING<br>・INJECTION MOTOR<br>・FIRST TIMING BELT<br>・LINEAR GUIDE |
| PLASTICIZATION MODE (SECOND MODE) | SECOND COMPONENT GROUP<br>・SECOND BEARING<br>・PLASTICIZATION MOTOR<br>・SECOND TIMING BELT<br>・REDUCTION GEAR |

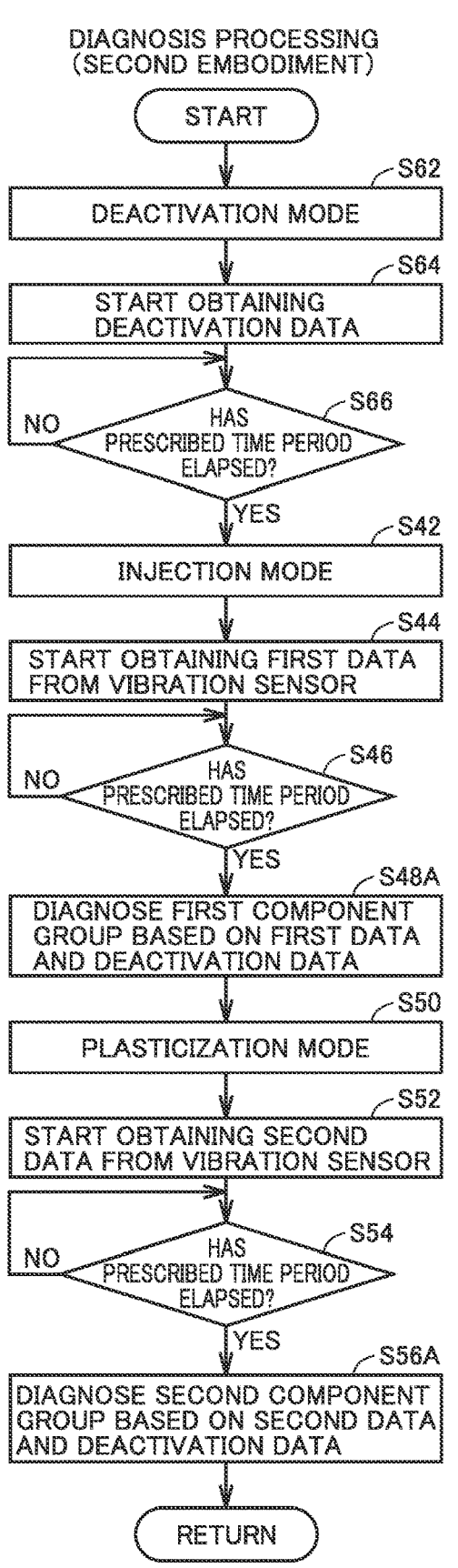

DIAGNOSIS PROCESSING
(SECOND EMBODIMENT)

START

S62
DEACTIVATION MODE

S64
START OBTAINING
DEACTIVATION DATA

S66
HAS PRESCRIBED TIME PERIOD ELAPSED?
NO
YES

S42
INJECTION MODE

S44
START OBTAINING FIRST DATA
FROM VIBRATION SENSOR

S46
HAS PRESCRIBED TIME PERIOD ELAPSED?
NO
YES

S48A
DIAGNOSE FIRST COMPONENT
GROUP BASED ON FIRST DATA
AND DEACTIVATION DATA

S50
PLASTICIZATION MODE

S52
START OBTAINING SECOND
DATA FROM VIBRATION SENSOR

S54
HAS PRESCRIBED TIME PERIOD ELAPSED?
NO
YES

S56A
DIAGNOSE SECOND COMPONENT
GROUP BASED ON SECOND DATA
AND DEACTIVATION DATA

RETURN

FIG.8

COMPONENT TO BE DIAGNOSED BY EACH SENSOR

| SENSOR | DIAGNOSED COMPONENT |
|---|---|
| VIBRATION SENSOR | ·FIRST COMPONENT GROUP<br>·SECOND COMPONENT GROUP |
| FIRST SOUND SENSOR | ·FIRST TIMING BELT |
| SECOND SOUND SENSOR | ·SECOND TIMING BELT |

INJECTION MOLDING MACHINE WITH CONTROLLER FOR DIAGNOSING INJECTION MOLDING MACHINE

CROSS REFERENCE TO RELATED APPLICATIONS

This nonprovisional application is based on Japanese Patent Application No. 2023-009165 filed with the Japan Patent Office on Jan. 25, 2023, the entire contents of which are hereby incorporated by reference.

BACKGROUND OF THE INVENTION

Field of the Invention

The present disclosure relates to an injection molding machine and a method of diagnosing an injection molding machine.

Description of the Background Art

For example, Japanese Patent Laying-Open No. 2021-74917 discloses an injection molding machine including a ball screw. This injection molding machine detects an abnormality of the ball screw by frequency analysis of vibration strength of the ball screw.

SUMMARY OF THE INVENTION

An injection molding machine includes a plurality of components including a ball screw. The plurality of components include a first component and a second component. In the injection molding machine, the first component and the second component other than the ball screw are preferably also diagnosed. In order to diagnose the first component and the second component, a configuration including a sensor that diagnoses the first component and a sensor that diagnoses the second component may be provided. In such a configuration, however, the number of sensors may disadvantageously increase.

This invention was made to solve such a problem, and an object thereof is to diagnose a first component and a second component while the number of sensors is suppressed.

In an injection molding machine and a method of diagnosing an injection molding machine according to the present disclosure, a first sensor detects first data of a first component and second data of a second component. In the injection molding machine and the method of diagnosing the injection molding machine, diagnosis processing for diagnosing the first component is performed based on the first data detected in a first mode and diagnosis processing for diagnosing the second component is performed based on the second data detected in a second mode.

The foregoing and other objects, features, aspects and advantages of this invention will become more apparent from the following detailed description of this invention when taken in conjunction with the accompanying drawings.

BRIEF DESCRIPTION OF THE DRAWINGS

FIG. 3 is a diagram showing an exemplary component to be diagnosed in each mode.

FIG. 5 is a flowchart showing a flow of control in the injection molding machine.
FIG. 7 is a flowchart showing a flow of diagnosis processing in a second embodiment.
FIG. 8 is a diagram showing exemplary correspondence between each sensor and a diagnosed component in a third embodiment.

DESCRIPTION OF THE PREFERRED EMBODIMENTS

Figure 1:
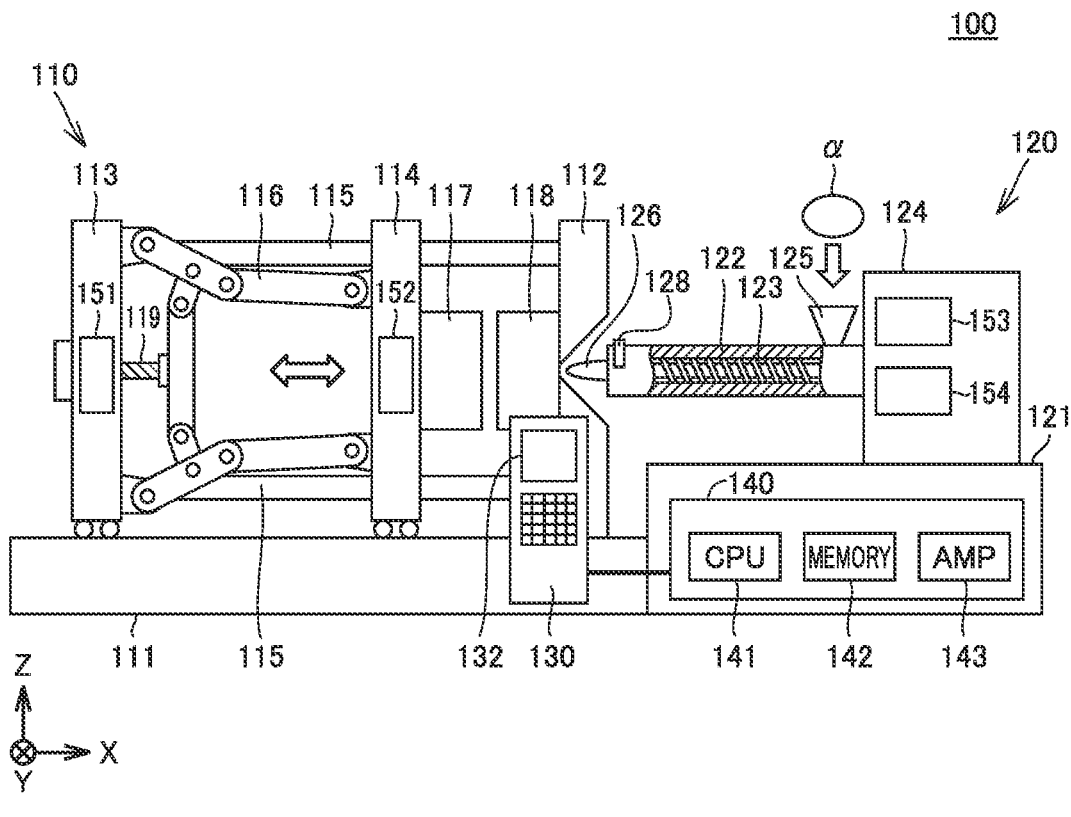
FIG. 1 is a diagram showing a construction of an injection molding machine.

An embodiment of the present invention will be described in detail below with reference to the drawings. The same or corresponding elements in the drawings have the same reference characters allotted and description thereof will not be repeated.

First Embodiment

[Construction of Injection Molding Machine]

FIG. 1 is a diagram for illustrating a construction of an injection molding machine 100. For the sake of convenience of description, a floor surface where injection molding machine 100 is arranged in FIG. 1 is defined as an XY plane and a direction perpendicular to the floor surface is defined as a Z-axis direction. A positive direction along a Z axis may be referred to as an upper surface side or above and a negative direction thereof may be referred to as a lower surface side or below. Though injection molding machine 100 is shown as a lateral injection molding machine, it is not limited to the lateral type but may be a vertical injection molding machine.

Injection molding machine 100 includes a mold clamping apparatus 110 that clamps a mold, an injection apparatus 120 that melts and injects an injection material, a control panel 130, and a controller 140. In FIG. 1, mold clamping apparatus 110 is arranged on a side of the negative direction along an X axis with respect to injection apparatus 120.

Mold clamping apparatus 110 includes a bed 111, a fixed plate 112, a mold clamping housing 113, a moving plate 114, a tie bar 115, a mold clamping mechanism 116, molds 117 and 118, and a ball screw 119. Bed 111 is arranged on the floor surface, and such apparatuses as fixed plate 112, mold clamping housing 113, and moving plate 114 are mounted on an upper surface thereof.

Fixed plate 112 is fixed on bed 111 at an end on a side closer to injection apparatus 120 (that is, the positive direction along the X axis). Mold clamping housing 113 is arranged on bed 111 at an end in the negative direction along the X axis. Fixed plate 112 and mold clamping housing 113 are coupled to each other by tie bar 115 including a plurality of bars. Mold clamping housing 113 is movable over bed 111 in an X-axis direction.

Moving plate 114 is arranged on bed 111 between fixed plate 112 and mold clamping housing 113. Moving plate 114 is constructed as being movable in the X-axis direction. Mold clamping housing 113 and moving plate 114 are coupled to each other by mold clamping mechanism 116. Mold clamping mechanism 116 includes a toggle mechanism. Ball screw 119 is coupled to the toggle mechanism. A servo motor 151 arranged in mold clamping housing 113 is driven to rotate ball screw 119, so that moving plate 114 can be moved relatively to mold clamping housing 113 in the X-axis direction. A direct acting type cylinder which is driven by a hydraulic pressure may be employed for mold clamping mechanism 116.

Molds 117 and 118 are arranged in moving plate 114 and fixed plate 112, respectively. Mold 117 and mold 118 are arranged as being opposed to each other between moving plate 114 and fixed plate 112. By moving mold 117 in the X-axis direction with the use of mold clamping mechanism 116, mold 117 and mold 118 can be brought in intimate contact with each other or moved away from each other. In the description below, a step of transition from a state in which molds 117 and 118 are distant from each other to a state in which the molds are in intimate contact with each other is referred to as "mold clamping." A step of transition from the state in which molds 117 and 118 are in intimate contact with each other to the state in which the molds are distant from each other is referred to as "mold opening."

While mold 117 and mold 118 are in intimate contact with each other in the mold clamping step, the molds are filled with a molten material (resin), and the molds are cooled to solidify the material. Then, a product (molded article) in a desired shape can be molded. After the product is molded, with mold 117 being distant from mold 118 in the mold opening step, an ejection mechanism (not shown) arranged in moving plate 114 can be activated to take the molded article out of mold 117. The ejection mechanism is driven by a servo motor 152 arranged in moving plate 114. A step of taking out a product with the use of the ejection mechanism is referred to as an "ejection" step.

Injection apparatus 120 includes a base 121, a heating cylinder 122, an actuation apparatus 124, a hopper 125, and a temperature sensor 128. Base 121 is arranged on the floor surface of bed 111 on the side of the positive direction along the X axis, and actuation apparatus 124 is mounted on an upper surface thereof. An injection motor 153, a plasticization motor 154, and the like are arranged in actuation apparatus 124.

Heating cylinder 122 that extends in the X-axis direction is arranged in actuation apparatus 124. Heating cylinder 122 includes a heater (not shown) that heats the inside, a screw 123, and an injection nozzle 126. Screw 123 is driven by plasticization motor 154 in actuation apparatus 124 and it is constructed as being rotatable around the X-axis direction as a rotation axis. Screw 123 is driven by injection motor 153 and it is constructed to be movable in the X-axis direction. Injection nozzle 126 is arranged at an end of heating cylinder 122 on a side of mold clamping apparatus 110 (that is, the end in the negative direction along the X axis). A resin material α like beads is injected into hopper 125. Heating cylinder 122 heats and melts resin material α, which is kneaded by screw 123 to produce a molten material. A step of melting the resin material as such is referred to as a "plasticization" step.

As will be described later, actuation apparatus 124 moves screw 123 in the X-axis direction, so that injection molding machine 100 brings injection nozzle 126 in contact with a sprue bush of mold 118 in mold clamping apparatus 110. Injection molding machine 100 then injects the molten material from injection nozzle 126 to fill a cavity in molds 117 and 118 with the molten material. A construction of a nozzle touch mechanism is implemented as set forth above. Injection motor 153 applies a pressure to the molten material by moving screw 123 in heating cylinder 122 in the negative direction along the X axis to inject the molten material into molds 117 and 118 and to hold a constant pressure of the injected molten material.

The step of injecting the molten material into molds 117 and 118 is referred to as an "injection" step. A step of holding the molten material filled in molds 117 and 118 at a constant pressure and cooling the molten material after the injection step is referred to as a "pressure holding" step.

Temperature sensor 128 is arranged in the vicinity of injection nozzle 126 in heating cylinder 122. Temperature sensor 128 detects a temperature of the molten material in heating cylinder 122 and outputs the temperature to controller 140. Controller 140 controls the heater based on a detection value from temperature sensor 128 and adjusts the temperature of the molten material to a desired temperature.

After the pressure holding step is completed, the mold opening step and the ejection step are performed to take out the molded product.

Injection molding machine 100 can successively form products by cyclically and repeatedly performing the mold clamping step, the injection step, the pressure holding step, the plasticization step, the mold opening step, and the ejection step. In the present embodiment, the mold clamping step, the injection step, the pressure holding step, the plasticization step, the mold opening step, and the ejection step are also collectively referred to as a "molding cycle."

Controller 140 is contained in base 121. Controller 140 includes a CPU 141, a memory 142, and a servo amplifier 143 for driving each motor. Controller 140 obtains detection values from various sensors arranged in injection molding machine 100 and controls injection molding machine 100 in an integrated manner.

Controller 140 can have injection molding machine 100 operate in a plurality of modes. The plurality of modes include an injection mode and a plasticization mode. The injection mode is a mode of performing the injection step described above and corresponds to the "first mode" in the present disclosure. The plasticization mode is a mode of performing the plasticization step described above and corresponds to the "second mode" in the present disclosure. Controller 140 has a mode flag indicating the mode of injection molding machine 100 stored in a random access memory (RAM) of memory 142.

Control panel 130 is an apparatus that allows an operator to operate injection molding machine 100 and includes a display 132 that shows various images and an input apparatus such as a keyboard. Control panel 130 is connected to controller 140, and can obtain a state of injection molding machine 100 and have the state shown or can output a user operation signal from the input apparatus to controller 140. Control panel 130 may be implemented by a touch panel including display 132 and the input apparatus as being integrated. Control panel 130 may be attached to bed 111 or base 121 of injection molding machine 100 or arranged at a position independent of injection molding machine 100.

[Construction of Actuation Apparatus]

Figure 2:
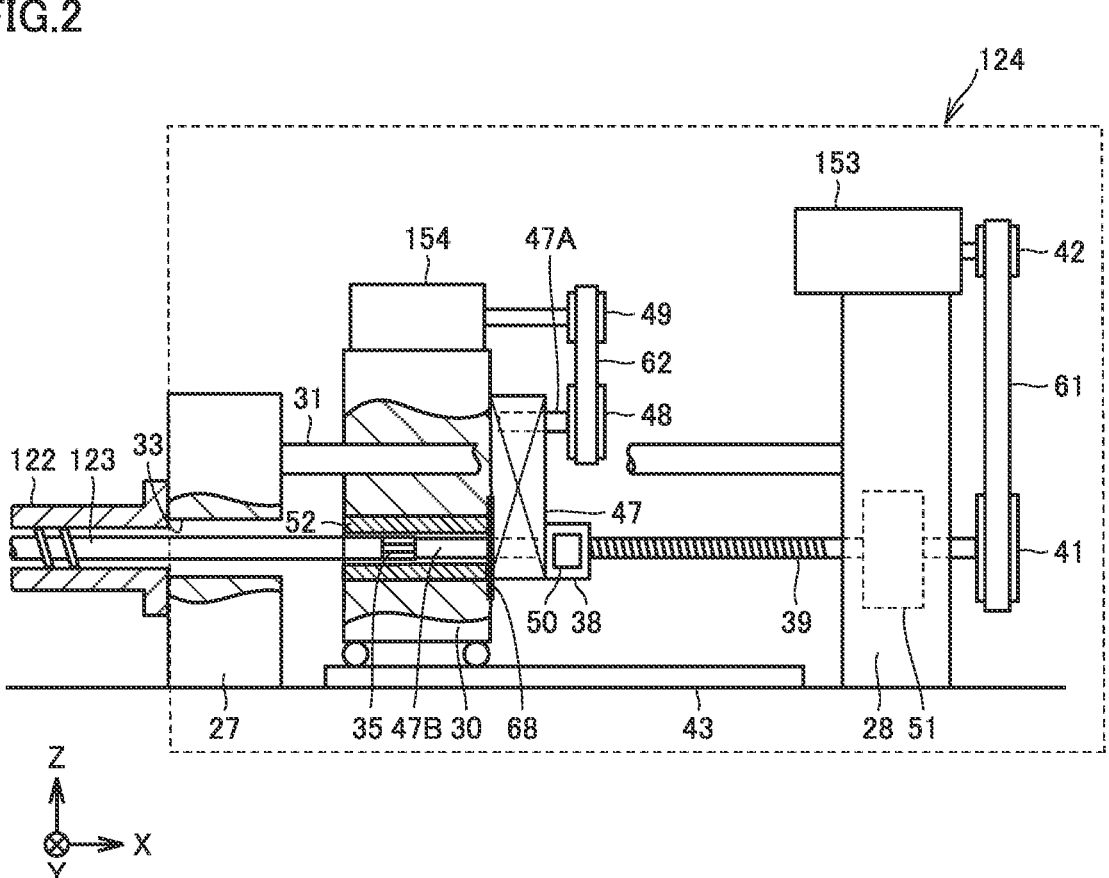
FIG. 2 is a diagram showing a construction of an actuation apparatus.

FIG. 2 is a diagram showing a detailed construction of actuation apparatus 124 in FIG. 1. Though FIG. 2 is mainly referred to in the description of actuation apparatus 124 below, FIG. 1 is also referred to as appropriate. FIG. 2 shows a part of heating cylinder 122 and a part of screw 123. As described with reference to FIG. 1, actuation apparatus 124 includes injection motor 153 and plasticization motor 154.

Actuation apparatus 124 further includes a fixed plate 27, an end plate 28, a linear guide 43, and a movable plate 30. Plasticization motor 154 is arranged in movable plate 30. Injection motor 153 is arranged in end plate 28. Fixed plate 27 and end plate 28 are coupled to each other by a guide bar 31. Movable plate 30 is arranged on linear guide 43. Linear guide 43 guides movable plate 30 in the X-axis direction. Movable plate 30 moves in the X-axis direction as being guided by guide bar 31.

Fixed plate 27 is provided with a hole 33, and a rear end of heating cylinder 122 is fixed such that this hole 33 coincides with a hole in heating cylinder 122. A rear end of screw 123 passes through hole 33 and is fixed to a rotational drive shaft 35. Rotational drive shaft 35 is coupled to an output shaft 47B of a reduction gear 47 which will be described later.

Actuation apparatus 124 further includes a ball screw 39, a ball screw nut 38, a first bearing 51, a first timing belt 61, linear guide 43, and a vibration sensor 50. Vibration sensor 50 corresponds to the "first sensor" in the present disclosure. First bearing 51 is accommodated in end plate 28. First bearing 51 rotatably supports a part of ball screw 39.

Ball screw nut 38 is fixed to movable plate 30 with later-described reduction gear 47 being interposed. Ball screw nut 38 is attached to ball screw 39. Ball screw 39 of ball screw nut 38 passes through end plate 28 and has a tip end protruding from end plate 28. A first pulley 41 is provided at this portion of protrusion. A second pulley 42 is provided on a rotation shaft of injection motor 153, and first timing belt 61 is wound around first pulley 41 and second pulley 42. First timing belt 61 transmits motive power from injection motor 153 to ball screw 39.

Therefore, when injection motor 153 is driven under the control by controller 140, motive power from injection motor 153 is transmitted to ball screw 39 by first timing belt 61. As ball screw 39 is rotated by the motive power, ball screw nut 38 moves in the X-axis direction and movable plate 30 also moves in the X-axis direction. As movable plate 30 moves in the X-axis direction, screw 123 moves in the X-axis direction. As set forth above, when injection motor 153 is driven under the control by controller 140, screw 123 moves in the X-axis direction.

Actuation apparatus 124 further includes reduction gear 47, a second timing belt 62, a second bearing 52, and a load cell 68. Second bearing 52 rotatably supports screw 123. Reduction gear 47 decelerates rotation of a rotation shaft of plasticization motor 154. A third pulley 48 is provided on an input shaft 47A of reduction gear 47. A fourth pulley 49 is provided on the rotation shaft of plasticization motor 154. Second timing belt 62 is wound around third pulley 48 and fourth pulley 49. Second timing belt 62 transmits the motive power from plasticization motor 154 to screw 123 through rotational drive shaft 35. Therefore, when plasticization motor 154 is driven under the control by controller 140, screw 123 rotates.

Load cell 68 is arranged in movable plate 30. Load cell 68 detects rotational torque of output shaft 47B.

Vibration sensor 50 is provided in ball screw nut 38. For example, an acceleration sensor is employed as vibration sensor 50. A role of vibration sensor 50 will be described later.

[Maintenance Mode]

A mode of injection molding machine 100 in the present embodiment includes a maintenance mode and a molding mode. The molding mode is a mode in which injection molding machine 100 manufactures a molded article. The maintenance mode is a mode of diagnosis processing for diagnosing a component of injection molding machine 100 to be diagnosed, while injection molding machine 100 is driven with a material α (see FIG. 1) not having been introduced. A component to be diagnosed is also referred to as a "diagnosed component" below. Diagnosis processing is processing including at least one of abnormality detection and lifetime prediction of the diagnosed component. For example, a user can select which of abnormality diagnosis of the diagnosed component and abnormality detection of the diagnosed component is to be conducted as the diagnosis processing.

In the maintenance mode, injection molding machine 100 operates in one of the injection mode and the plasticization mode described above.

FIG. 3 shows an exemplary component to be diagnosed in each mode. Though FIG. 3 is mainly referred to in the description of the diagnosed component below, FIG. 2 is also referred to as appropriate. Components to be diagnosed in the injection mode are a group of components used in the injection mode. This group of components is also referred to as the "first component group" in the present disclosure. In the example in FIG. 3, the components to be diagnosed in the injection mode include ball screw nut 38 (see FIG. 2), ball screw 39, first bearing 51, injection motor 153, first timing belt 61, and linear guide 43. Injection motor 153 corresponds to the "first component" in the present disclosure. Components (ball screw nut 38, ball screw 39, first bearing 51, first timing belt 61, and linear guide 43) other than injection motor 153 in the first component group are each also referred to as a "third component." In other words, the first component group is composed of the first component and the third component.

Components to be diagnosed in the plasticization mode are a group of components used in the plasticization mode. This group of components corresponds to the "second component group" in the present disclosure. In the example in FIG. 3, the components to be diagnosed in the plasticization mode include second bearing 52, plasticization motor 154, second timing belt 62, and reduction gear 47. Plasticization motor 154 corresponds to the "second component" in the present disclosure. Components (second bearing 52, second timing belt 62, and reduction gear 47) other than plasticization motor 154 in the second component group are each also referred to as a "fourth component." In other words, the second component group is composed of the second component and the fourth component.

As described above, injection motor 153 corresponds to the "first component" in the present disclosure. Plasticization motor 154 corresponds to the "second component" in the present disclosure. In other words, the injection mode refers to a mode in which injection motor 153 (first component) is driven but plasticization motor 154 (second component) is not driven. The injection mode refers to a mode in which the third component is used but the fourth component is not used. The plasticization mode refers to a mode in which plasticization motor 154 (second component) is driven but injection motor 153 (first component) is not driven. The plasticization mode is a mode in which the fourth component is used but the third component is not used.

When the mode of injection molding machine 100 is set to the injection mode, vibration originates from injection motor 153. The vibration is transmitted to (via) the third component (ball screw 39, first bearing 51, first timing belt 61, and linear guide 43) other than ball screw nut 38 and reaches ball screw nut 38.

When the mode of injection molding machine 100 is set to the plasticization mode, vibration originates from plasticization motor 154. The vibration is transmitted to (via) all of the fourth components (second bearing 52, second timing belt 62, and reduction gear 47) and reaches ball screw nut 38.

As described above, vibration sensor 50 is arranged in ball screw nut 38. Therefore, in any of the injection mode and the plasticization mode of injection molding machine 100, vibration is transmitted to ball screw nut 38. Therefore, vibration sensor 50 arranged in this ball screw nut 38 can detect this vibration. Vibration sensor 50 then outputs vibration data indicating the detected vibration to controller 140. The vibration data is waveform data indicating vibration and it is data in a time domain. Controller 140 performs diagnosis processing for diagnosing the diagnosed component of injection molding machine 100 based on this vibration data. Since the vibration data is used for the diagnosis processing, it is also referred to as "diagnosis data."

Specifically, in the example in FIG. 3, controller 140 performs the diagnosis processing for diagnosing each component (ball screw nut 38, ball screw 39, first bearing 51, injection motor 153, first timing belt 61, and linear guide 43) included in the first component group based on the vibration data in the injection mode. The "vibration data in the injection mode" corresponds to the "first data" in the present disclosure. The diagnosis processing for diagnosing the first component group corresponds to the "first diagnosis processing" in the present disclosure.

Controller 140 performs the diagnosis processing for diagnosing each component (second bearing 52, second timing belt 62, plasticization motor 154, and reduction gear 47) included in the second component group based on the vibration data in the plasticization mode. The "vibration data in the plasticization mode" corresponds to the "second data" in the present disclosure. The diagnosis processing for diagnosing the second component group corresponds to the "second diagnosis processing" in the present disclosure.

[Functional Block Diagram of Controller]

Figure 4:
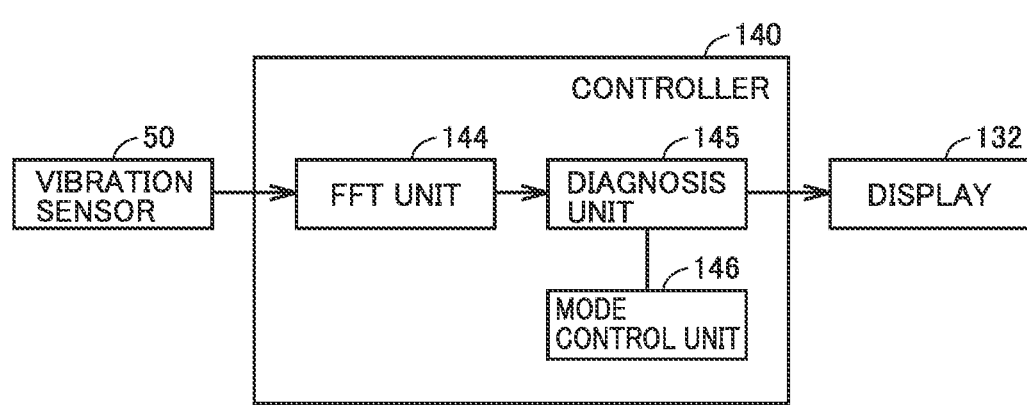
FIG. 4 is a functional block diagram of a controller.

FIG. 4 is a functional block diagram of controller 140. Though FIG. 4 is mainly referred to in the description of controller 140 below, FIGS. 1 to 3 are also referred to as appropriate. Controller 140 includes a fast Fourier transform (FFT) unit 114, a diagnosis unit 145, and a mode control unit 146.

Mode control unit 146 sets the mode of injection molding machine 100 and has injection molding machine 100 operate in that mode. Mode control unit 146 sets, for example, the molding mode or the maintenance mode described above. When mode control unit 146 sets the maintenance mode, it sets the injection mode or the plasticization mode.

Vibration sensor 50 outputs vibration data to controller 140. FFT unit 144 performs Fourier transform on the vibration data to convert the vibration data into data in a frequency domain (which is also referred to as "frequency data" below). In the present embodiment, FFT unit 144 converts vibration data in the injection mode into frequency data (a frequency spectrum) and converts vibration data in the plasticization mode into frequency data (a frequency spectrum).

The resultant frequency data is outputted to diagnosis unit 145. Diagnosis unit 145 holds, for example, damage frequency data of each of diagnosed components. The damage frequency data is a frequency spectrum of vibration data detected in advance by vibration sensor 50 when abnormality occurs in a diagnosed component. For example, diagnosis unit 145 compares the frequency spectrum from FFT unit 144 with the frequency spectrum shown by the damage frequency data. When the frequency spectrum from FFT unit 144 is identical or similar to the frequency spectrum shown by the damage frequency data, diagnosis unit 145 determines that the diagnosed component corresponding to the damage frequency data is abnormal. When the frequency spectrum from FFT unit 144 is not similar to the frequency spectrum shown by the damage frequency data, diagnosis unit 145 determines that the diagnosed component corresponding to the damage frequency data is normal. In the present embodiment, the damage frequency data includes first damage frequency data corresponding to each of the diagnosed components included in the first component group and second damage frequency data corresponding to each of the diagnosed components included in the second component group.

For example, when mode control unit 146 sets the injection mode, diagnosis unit 145 diagnoses each component in the first component group based on the frequency data converted by FFT unit 144 and the first damage frequency data corresponding to each of the diagnosed components included in the first component group. Alternatively, when mode control unit 146 sets the plasticization mode, diagnosis unit 145 diagnoses each component in the second component group based on the frequency data converted by FFT unit 144 and the second damage frequency data corresponding to each of the diagnosed components included in the second component group.

In a modification, a frequency spectrum to be compared with the frequency spectrum from FFT unit 144 may be a frequency spectrum shown by frequency data in a normal condition. The frequency data in the normal condition refers to a frequency spectrum of vibration data detected in advance by vibration sensor 50 when a diagnosed component is normal (no abnormality has occurred).

In an example where such a configuration is adopted, when the frequency spectrum from FFT unit 144 is identical or similar to the frequency spectrum shown by the frequency data in the normal condition, diagnosis unit 145 determines that the diagnosed component corresponding to the frequency data in the normal condition is normal. Alternatively, when the frequency spectrum from FFT unit 144 is not similar to the frequency spectrum shown by the frequency data in the normal condition, diagnosis unit 145 determines that the diagnosed component corresponding to the frequency data in the normal condition is abnormal.

Diagnosis unit 145 generates image data showing a result of diagnosis and outputs the image data to display 132. Display 132 shows an image showing the result of diagnosis. The user can thus recognize the result of diagnosis.

In an example where the diagnosis processing is processing for detecting abnormality of a diagnosed component, when diagnosis unit 145 detects the abnormality of first bearing 51 (see FIG. 2), diagnosis unit 145 has an image showing "abnormality of first bearing 51" shown on display 132. This image is, for example, a text image "abnormality in first bearing."

Alternatively, in an example where the diagnosis processing is processing for detecting lifetime of a diagnosed component, diagnosis unit 145 has an image showing the lifetime of the diagnosed component shown on display 132. This image is, for example, a text image "remaining lifetime of the first bearing being three years."

An injection molding machine in a comparative example will now be described. For example, the first component group and the second component group of the injection molding machine are preferably diagnosed. In order to diagnose the first component group and the second component group, an injection molding machine (which is also referred to as an "injection molding machine in a first comparative example" below) including a sensor that diagnoses the first component group and a sensor that diagnoses the second component group may be provided. In the injection molding machine in such a first comparative example, however, the number of sensors may disadvantageously increase.

In contrast, injection molding machine 100 in the present embodiment diagnoses the first component group based on vibration data from vibration sensor 50 in the injection mode and diagnoses the second component group based on vibration data from vibration sensor 50 in the plasticization mode. Therefore, injection molding machine 100 can use vibration sensor 50 in both of diagnosis of the first component group and diagnosis of the second component group. Therefore, injection molding machine 100 in the present embodiment can diagnose the first component group and the second component group with the number of sensors being smaller than in the injection molding machine in the first comparative example.

As shown in FIG. 3, the first component group includes ball screw 39, ball screw nut 38, first bearing 51, injection motor 153, first timing belt 61, and linear guide 43. Therefore, injection molding machine 100 can diagnose these components included in the first component group. As shown in FIG. 3, the second component group includes plasticization motor 154, second bearing 52, second timing belt 62, and reduction gear 47. Therefore, injection molding machine 100 can diagnose these components included in the second component group.

Vibration sensor 50 is provided in ball screw nut 38 (see FIG. 2). Ball screw nut 38 is a part to which vibration is transmitted in any of the injection mode and the plasticization mode. Therefore, injection molding machine 100 can use vibration sensor 50 in both of diagnosis of the first component group and diagnosis of the second component group.

Injection molding machine 100 performs the diagnosis processing when the mode of injection molding machine 100 is set to the maintenance mode. The maintenance mode is a mode, transition to which is made by an operation by a user. Therefore, the user can have injection molding machine 100 perform the diagnosis processing for a period as desired by the user.

An injection molding machine (which is also referred to as an "injection molding machine in a second comparative example" below) that performs diagnosis processing with material α (see FIG. 1) having been introduced in the injection molding machine may be applicable. In the injection molding machine in the second comparative example, however, a pressure or the like is produced in injection molding machine 100 due to material α. Therefore, vibration data detected by the injection molding machine in the second comparative example may include noise based on the pressure, which may lead to lower accuracy in diagnosis.

In contrast, injection molding machine 100 in the present embodiment performs the diagnosis processing with material α not having been introduced in injection molding machine 100. Therefore, the injection molding machine performs the diagnosis processing based on vibration data without the noise, and hence lowering in accuracy in diagnosis can be lessened.

As shown in FIG. 4, controller 140 of injection molding machine 100 converts vibration data into frequency data through FFT processing. Controller 140 then performs the diagnosis processing based on the frequency data. Injection molding machine 100 in the present embodiment can thus perform the diagnosis processing through the known FFT processing.

[Flowchart]

Figure 5:
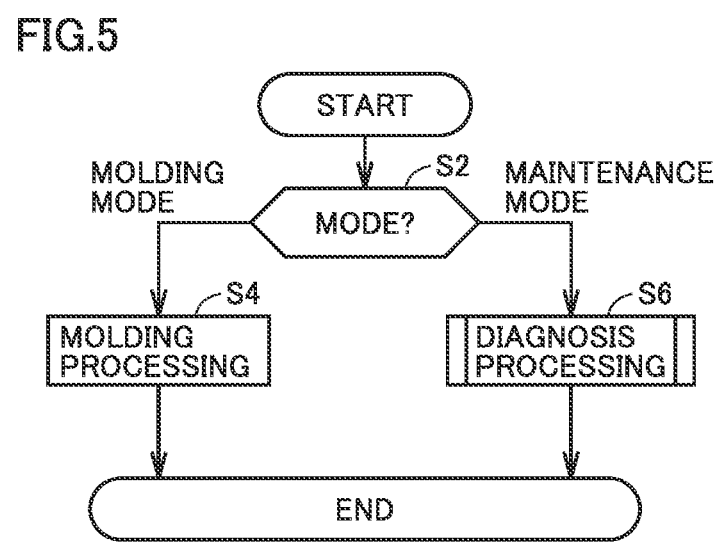

A flow of main control in injection molding machine 100 will now be described. FIG. 5 is a flowchart showing a flow of control in injection molding machine 100. Though FIG. 5 is mainly referred to in the description of control in injection molding machine 100 below, FIGS. 1 to 4 are also referred to as appropriate. Processing in the flowchart in FIG. 5 is processing performed, for example, when power of injection molding machine 100 is turned on and when switching to any of the molding mode and the maintenance mode is made.

Initially, in step S2, injection molding machine 100 identifies the current mode by identifying a mode flag stored in the RAM described above. When the current mode is the molding mode in step S2, the process proceeds to step S4. In step S4, injection molding machine 100 performs molding processing. The process then ends.

When the current mode is the maintenance mode in step S2, the process proceeds to step S6. In step S6, injection molding machine 100 performs diagnosis processing for diagnosing a diagnosed component.

Figure 6:
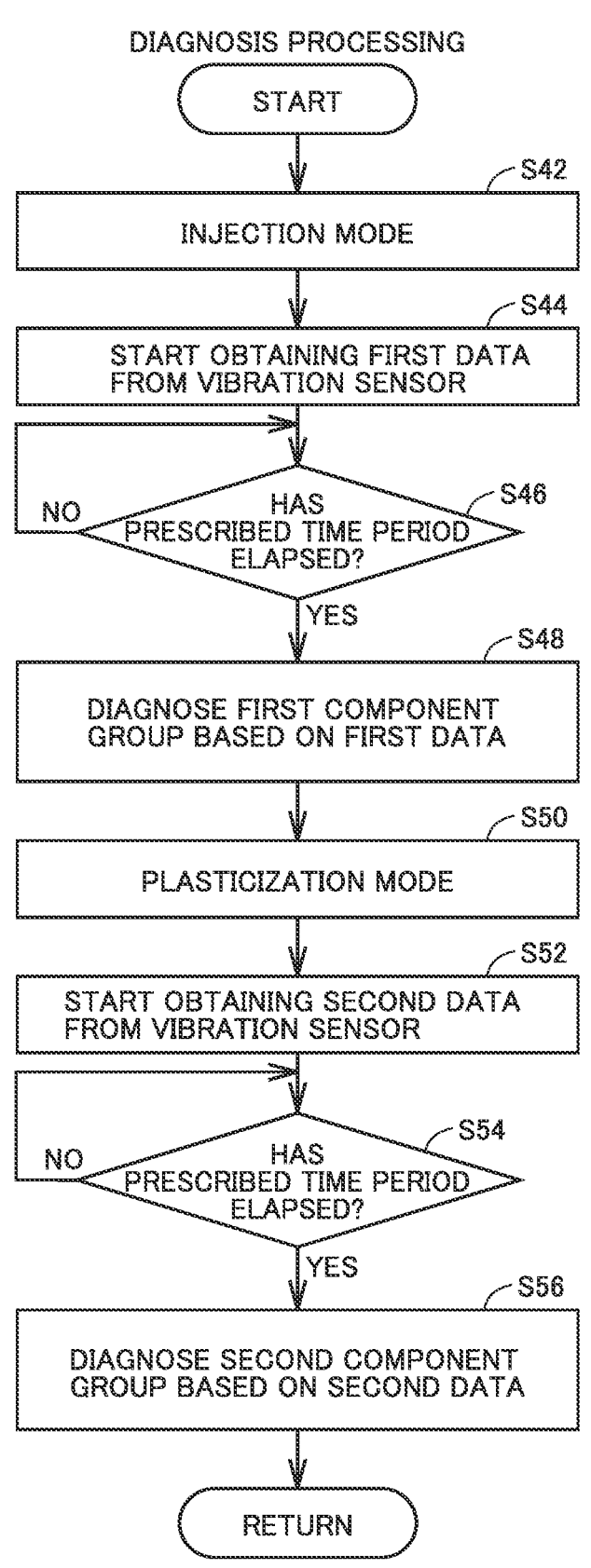
FIG. 6 is a flowchart showing a flow of diagnosis processing.

FIG. 6 is a flowchart showing a flow of the diagnosis processing in the maintenance mode. In step S42, injection molding machine 100 switches the mode of injection molding machine 100 to the injection mode. In the injection mode, injection molding machine 100 drives injection motor 153. Then, in step S44, injection molding machine 100 starts obtaining vibration data (first data) from vibration sensor 50.

Then, in step S46, injection molding machine 100 determines whether or not a prescribed time period has elapsed since it started obtaining vibration data. In step S46, injection molding machine 100 stands by until the prescribed time period elapses (NO in step S46). When the prescribed time period has elapsed (YES in step S46), the process proceeds to step S48.

In step S48, injection molding machine 100 diagnoses the first component group (see FIG. 3) based on the vibration data obtained within the prescribed time period in step S46.

Then, in step S50, injection molding machine 100 switches the mode of injection molding machine 100 to the plasticization mode. In the plasticization mode, injection molding machine 100 drives plasticization motor 154. Then, in step S52, injection molding machine 100 starts obtaining vibration data (second data) from vibration sensor 50.

Then, in step S54, injection molding machine 100 determines whether or not a prescribed time period has elapsed since it started obtaining vibration data. In step S54, injection molding machine 100 stands by until the prescribed time period elapses (NO in step S54). When the prescribed time period has elapsed (YES in step S54), the process proceeds to step S56.

In step S56, injection molding machine 100 diagnoses the second component group (see FIG. 3) based on the vibration data obtained within the prescribed time period in step S54. Injection molding machine 100 in the present embodiment thus performs the diagnosis processing in real time in the maintenance mode.

Second Embodiment

External vibration may be transmitted from the outside of injection molding machine 100 to this injection molding machine 100. For example, injection molding machine 100 may be provided adjacently to another injection molding machine in a factory. In this case, while another injection molding machine is performing the molding processing, vibration generated in another injection molding machine may be transmitted to injection molding machine 100 as external vibration. When injection molding machine 100 performs the diagnosis processing while external vibration is transmitted to injection molding machine 100, vibration sensor 50 (see FIG. 2) may detect also vibration noise based on the external vibration and accuracy in diagnosis by injection molding machine 100 may lower.

In a second embodiment, injection molding machine 100 performs the diagnosis processing based not only on vibration data in the injection mode and vibration data in the plasticization mode but also on data detected by vibration sensor 50 in a deactivation mode. The deactivation mode refers to a mode in which all components other than controller 140 are deactivated. "Data detected by vibration sensor 50 in the deactivation mode" corresponds to the "deactivation data" in the present disclosure. In the present embodiment, the deactivation data is data in a time domain.

FIG. 7 is a flowchart showing a flow of the diagnosis processing in the second embodiment. The diagnosis processing in FIG. 7 includes processing in step S62 to step S66 in addition to the diagnosis processing in FIG. 6 and includes step S48A and step S56A in place of step S48 and step S56 in FIG. 6.

Initially, in step S62, injection molding machine 100 switches the mode of injection molding machine 100 to the deactivation mode. Then, in step S64, injection molding machine 100 starts obtaining vibration data from vibration sensor 50 in the deactivation mode. Then, in step S66, injection molding machine 100 determines whether or not a prescribed time period has elapsed since it started obtaining deactivation data. In step S66, injection molding machine 100 stands by until the prescribed time period elapses (NO in step S66). When the prescribed time period has elapsed (YES in step S66), the process proceeds to step S42.

When determination as YES is made in step S46, in step S48A, injection molding machine 100 diagnoses the first component group (see FIG. 3) based on the deactivation data obtained within the prescribed time period in step S66 and the vibration data obtained within the prescribed time period in step S46.

The deactivation data is vibration data obtained by vibration sensor 50 in the deactivation mode in which components other than controller 140 are inactive. Therefore, this vibration data (deactivation data) includes vibration noise based on external vibration. In step S44, for example, the first component group is diagnosed based on differential data between the first data and the deactivation data. The differential data refers to data showing a differential value. The differential value is calculated, for example, by subtracting an amplitude value of the deactivation data in the time domain from an amplitude value of the first data in the time domain. Therefore, the differential data is vibration data in the injection mode from which vibration noise has been removed.

Injection molding machine 100 converts the differential data in the time domain into frequency data. Injection molding machine 100 then diagnoses the first component group based on the frequency data and damage frequency data of each of the components included in the first component group.

When determination as YES is made in step S54, in step S56A, injection molding machine 100 diagnoses the second component group (see FIG. 3) based on the deactivation data obtained within the prescribed time period in step S66 and the vibration data obtained within the prescribed time period in step S54.

In step S54, specifically, injection molding machine 100 diagnoses the second component group based on differential data between the second data and the deactivation data. The differential data refers to vibration data in the plasticization mode from which vibration noise has been removed. Injection molding machine 100 converts the differential data into frequency data. Injection molding machine 100 then diagnoses the second component group based on the frequency data and damage frequency data of each of the components included in the second component group.

In this embodiment, an example in which the differential data is data showing a difference between the diagnosis data (first data and second data) in the time domain and the deactivation data in the time domain is described. In a modification, however, the differential data may be data showing a difference between the diagnosis data (first data and second data) in the frequency domain and the deactivation data in the frequency domain. In such a case, the differential data in the frequency domain is calculated, for example, by subtraction of power spectrum values corresponding to frequencies identical to N (N being an integer not smaller than one) respective frequencies in the deactivation data from respective power spectrum values of the N frequencies in the diagnosis data.

Third Embodiment

A configuration in which vibration sensor 50 is used in both of the diagnosis processing for diagnosing the first component group and the diagnosis processing for diagnosing the second component group is described in the first embodiment and the second embodiment. Injection molding machine 100 in a third embodiment includes not only vibration sensor 50 but also a second sensor and a third sensor. A sensor different in measurement and detection principles from vibration sensor 50 is employed as at least one of the second sensor and the third sensor.

The second sensor is a sensor configured to detect data of the first component group but not to detect data of the second component group. The third sensor is a sensor configured to detect data of the second component group but not to detect data of the first component group. In the present embodiment, a sound sensor is assumed as the second sensor and the third sensor. The sound sensor is a sensor that detects sound.

FIG. 8 is a diagram showing exemplary correspondence between each sensor and a diagnosed component in the third embodiment. Though FIG. 8 is mainly referred to in the description of the correspondence below, FIGS. 1 and 2 are also referred to as appropriate. As shown in FIG. 8, injection molding machine 100 in the third embodiment includes a first sound sensor and a second sound sensor. The first sound sensor corresponds to the "second sensor" in the present disclosure and the second sound sensor corresponds to the "third sensor" in the present disclosure.

In the example in FIG. 8, as described in the first embodiment and the like, vibration sensor 50 detects vibration data of the first component group and vibration data of the second component group. The first sound sensor is provided at a position where it detects operating noise of first timing belt 61 (see FIG. 2) whereas it does not detect operating noise of the second component group. The second sound sensor is provided at a position where it detects operating noise of second timing belt 62 (see FIG. 2) whereas it does not detect operating noise of the first component group.

Injection molding machine 100 then diagnoses the first component group based on the vibration data from vibration sensor 50 in the injection mode. Furthermore, injection molding machine 100 diagnoses first timing belt 61 based on sound data detected by the first sound sensor in the injection mode.

Injection molding machine 100 diagnoses the second component group based on the vibration data from vibration sensor 50 in the plasticization mode. Furthermore, injection molding machine 100 diagnoses second timing belt 62 based on sound data detected by the second sound sensor in the plasticization mode.

Thus, in the third embodiment, injection molding machine 100 includes not only vibration sensor 50 used for the diagnosis processing for diagnosing the first component group and the second component group but also the first sound sensor and the second sound sensor. In the diagnosis processing, injection molding machine 100 supplementarily uses detection data (sound data) obtained by the first sound sensor and the second sound sensor in addition to detection data (vibration data) obtained by vibration sensor 50. Injection molding machine 100 can thus achieve improvement in accuracy in diagnosis.

Other Embodiments (1) In the embodiments described above, the configuration in which injection molding machine 100 performs the diagnosis processing with material α (see FIG. 1) not having been introduced in injection molding machine 100 is described. Injection molding machine 100, however, may perform the diagnosis processing with material α having been introduced in injection molding machine 100.

For example, injection molding machine 100 may perform the diagnosis processing while it performs the molding processing. According to such a configuration, injection molding machine 100 does not require time for the diagnosis processing in the maintenance mode. When abnormality of a diagnosed component is detected or a sign of abnormality of the diagnosed component is detected in an example where such a configuration is adopted, injection molding machine 100 may perform deactivation-associated processing. The deactivation-associated processing includes at least one of "processing for deactivating injection molding machine 100" and "processing for notifying a user of injection molding machine 100 of the sign of abnormality."

When injection molding machine 100 performs the diagnosis processing while it performs the molding processing, diagnosis accuracy may be lower than in an example where it performs the diagnosis processing in the maintenance mode. Injection molding machine 100, however, can suppress the problem of lowering in accuracy in diagnosis by supplementarily using the second sensor and the third sensor in the third embodiment in addition to vibration sensor 50. As described above, vibration sensor 50 is a sensor used in both of diagnosis of the first component group and diagnosis of the second component group. The second sensor and the third sensor are different in measurement and detection principles from vibration sensor 50. In addition, injection molding machine 100 can achieve suppression of lowering in accuracy in diagnosis also by utilization of machine learning based on accumulated data as will be described later.

(2) In the embodiments described above, a configuration in which the vibration sensor is used in both of diagnosis of the first component group and diagnosis of the second component group is described. The sensor to be used in both of these diagnoses, however, may be other sensors different in measurement and detection principles from vibration sensor 50. Other sensors may include, for example, a sound sensor, a temperature sensor, and a camera. Even in an example where other sensors are adopted as the sensor to be used in both of these diagnoses, injection molding machine 100 diagnoses the first component group and diagnoses the second component group based on diagnosis data outputted from other sensors. The diagnosis data is data used for the diagnosis processing, and it is vibration data in the embodiments described above.

In the embodiments described above, an example in which vibration sensor 50 is arranged in ball screw nut 38 is described. Vibration sensor 50, however, may be arranged at another location so long as it is capable of detecting vibration of the first component group and vibration of the second component group. Another location is, for example, movable plate 30 (see FIG. 2) or load cell 68.

(3) In the embodiments described above, a configuration in which injection molding machine 100 performs the diagnosis processing in real time in the maintenance mode is described. Injection molding machine 100, however, may accumulate the diagnosis data (for example, the vibration data described above) and may have the accumulated diagnosis data stored in the RAM or the like as accumulated data. Injection molding machine 100 then performs the diagnosis processing based on this accumulated data. Injection molding machine 100 obtains the accumulated data in at least one of the maintenance mode and the molding mode.

(4) In the embodiments described above, a configuration in which FFT is performed (see FFT unit 144 in FIG. 4) as an exemplary technique for the diagnosis processing is described. Injection molding machine 100, however, may perform the diagnosis processing with another technique.

Figure 9:
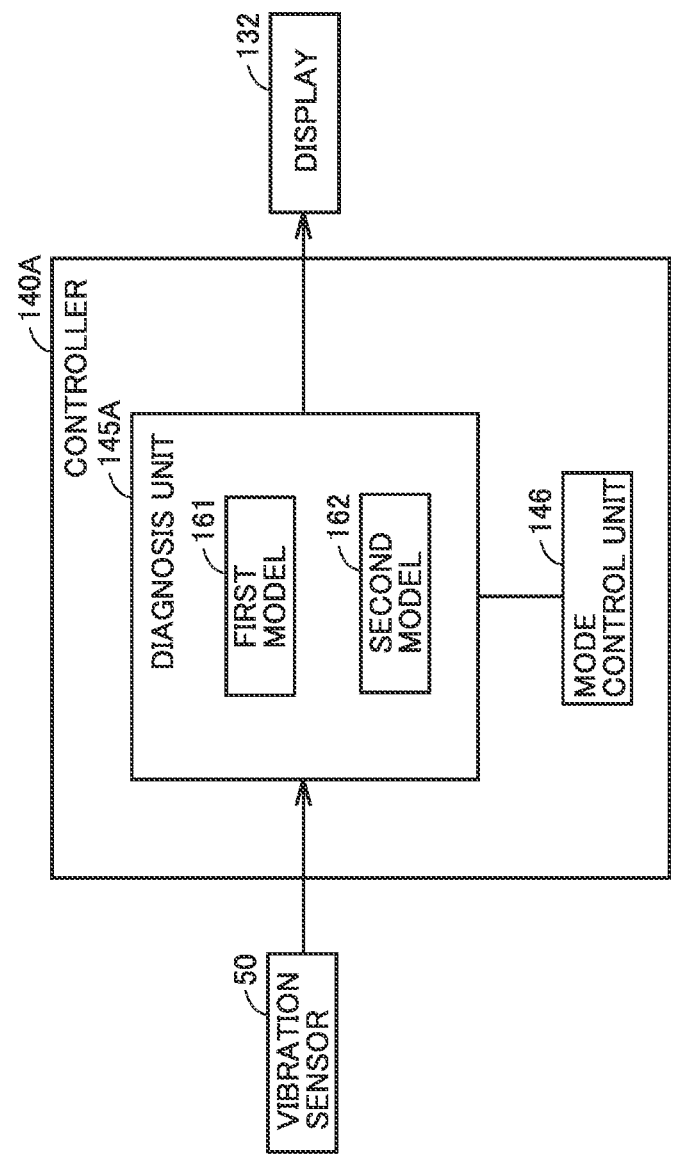
FIG. 9 is a functional block diagram of a controller in another embodiment.

For example, a configuration in which injection molding machine 100 performs the diagnosis processing with the use of a machine learning model may be adopted. FIG. 9 is a diagram for illustrating an exemplary functional configuration of a controller 140A when such a configuration is adopted. In an embodiment in which such a configuration is adopted, controller 140 in FIG. 4 is replaced with controller 140A in FIG. 9.

Controller 140A includes a diagnosis unit 145A and mode control unit 146 (see FIG. 4). Diagnosis unit 145A includes a first model 161 and a second model 162. For example, a known element such as a neural network is employed as first model 161 and second model 162. First model 161 and second model 162 are each a trained machine learning model. First model 161 is a model to be used for the first diagnosis processing and second model 162 is a model to be used for the second diagnosis processing.

Mode control unit 146 selects one of first model 161 and second model 162 in accordance with a mode that it has set. For example, when mode control unit 146 has set the injection mode, it selects first model 161. Diagnosis unit 145A then extracts a feature value from the diagnosis data (vibration data) from vibration sensor 50. The feature value is, for example, an effective value of this diagnosis data. Diagnosis unit 145A performs the first diagnosis processing by inputting the feature value into selected first model 161. Alternatively, when mode control unit 146 has set the plasticization mode, it selects second model 162. Diagnosis unit 145A then performs the second diagnosis processing by inputting the feature value into selected second model 162.

Another type of information may be adopted as the feature value. For example, a configuration in which diagnosis unit 145A converts diagnosis data in the time domain from vibration sensor 50 into data in the frequency domain (frequency spectrum) may be adopted. When such a configuration is adopted, the feature value is data in the frequency domain.

A configuration in which diagnosis unit 145A does not extract the feature value may be adopted. In such a configuration, for example, diagnosis data (vibration data) for a prescribed period is inputted to diagnosis unit 145A. Diagnosis unit 145A then performs the first diagnosis processing and the second diagnosis processing by inputting the diagnosis data into the selected model (first model 161 or second model 162).

Injection molding machine 100 may train first model 161 and second model 162 (update of the machine learning model) based on accumulated data below. For example, training of first model 161 may be supervised learning where accumulated data including diagnosis data detected in the first mode and a result of diagnosis of the first component group is used as training data. The result of diagnosis of the first component group is information indicating at least one of a result of detection as to whether or not the first component group is abnormal and a result of prediction of lifetime of the first component group.

Training of second model 162 may be supervised learning in which accumulated data including diagnosis data detected in the second mode and a result of diagnosis of the second component group is used as training data. A result of diagnosis of the second component group is information indicating at least one of a result of detection as to whether or not the second component group is abnormal and a result of prediction of lifetime of the second component group. A method of training is not limited to this method but another method may be applicable.

Injection molding machine 100 may train first model 161 and second model 162 based on diagnosis data accumulated with material α not having been introduced therein. Alternatively, injection molding machine 100 may train first model 161 and second model 162 based on diagnosis data accumulated with material α having been introduced therein. Furthermore, injection molding machine 100 may train first model 161 and second model 162 based on both of the diagnosis data accumulated with material α not having been introduced therein and the diagnosis data accumulated with material α having been introduced therein.

(5) In the embodiments described above, injection molding machine 100 including linear guide 43 and reduction gear 47 shown in FIG. 2 is described. Injection molding machine 100, however, does not have to include at least one of linear guide 43 and reduction gear 47.

(6) In the embodiments described above, the first diagnosis processing is described as processing for diagnosing the first component group including a plurality of components. The first diagnosis processing, however, may be processing for diagnosing a first component. The second diagnosis processing is described as processing for diagnosing the second component group including a plurality of components. The second diagnosis processing, however, may be processing for diagnosing a second component.

[Additional Aspects]

Illustrative embodiments described above are understood by a person skilled in the art as specific examples of aspects below.

(Clause 1) An injection molding machine includes a first component, a second component, a controller, and a first sensor. The controller drives the first component and the second component. The first sensor detects first data of the first component and second data of the second component. The controller operates the injection molding machine using one of a plurality of modes including a first mode and a second mode. The first mode is a mode in which the first component is driven but the second component is not driven. The second mode is a mode in which the second component is driven but the first component is not driven. The controller performs first diagnosis processing including at least one of abnormality detection and lifetime prediction of the first component based on the first data detected in the first mode. The controller performs second diagnosis processing including at least one of abnormality detection and lifetime prediction of the second component based on the second data detected in the second mode.

(Clause 2) The injection molding machine according to Clause 1 includes a first component group including the first component and a third component and a second component group including the second component and a fourth component. The first mode is a mode in which the third component is used but the fourth component is not used. The second mode is a mode in which the fourth component is used but the third component is not used. The first diagnosis processing includes at least one of abnormality detection and lifetime prediction of the first component group. The second diagnosis processing includes at least one of abnormality detection and lifetime prediction of the second component group.

(Clause 3) The injection molding machine according to Clause 2 includes a screw that rotates and is movable in a prescribed direction. The first mode is an injection mode in which the screw is moved in the prescribed direction. The second mode is a plasticization mode in which the screw is rotated. The first component group includes a ball screw, a ball screw nut attached to the ball screw, a first bearing that rotatably supports the ball screw, a first motor, and a first timing belt that transmits motive power from the first motor to the ball screw. With rotation of the ball screw, the ball screw nut moves the screw in the prescribed direction. The second component group includes a second bearing that rotatably supports the screw, a second motor, and a second timing belt that transmits motive power from the second motor to the screw.

(Clause 4) In the injection molding machine according to Clause 3, the first component group further includes a linear guide that guides movement of the screw in the prescribed direction.

(Clause 5) In the injection molding machine according to Clause 3 or 4, the second component group further includes a reduction gear of the second motor.

(Clause 6) In the injection molding machine according to any one of Clauses 3 to 5, the first sensor is attached to the ball screw nut.

(Clause 7) In the injection molding machine according to any one of Clauses 1 to 6, the first sensor detects vibration of the first component and vibration of the second component.

(Clause 8) In the injection molding machine according to any one of Clauses 1 to 7, the plurality of modes include a deactivation mode in which all components of the injection molding machine are deactivated. The controller performs the first diagnosis processing based on the first data detected in the first mode and deactivation data detected by the first sensor in the deactivation mode. The controller performs the second diagnosis processing based on the second data detected in the second mode and the deactivation data.

(Clause 9) In the injection molding machine according to any one of Clauses 1 to 8, the plurality of modes include a maintenance mode and a molding mode, the injection molding machine producing a molded article in the molding mode. The controller performs the first diagnosis processing and the second diagnosis processing during the maintenance mode.

(Clause 10) The injection molding machine according to any one of Clauses 1 to 9 manufactures a molded article from a material injected into the injection molding machine. The controller performs the first diagnosis processing and the second diagnosis processing with the material not having been introduced in the injection molding machine.

(Clause 11) The injection molding machine according to any one of Clauses 1 to 9 manufactures a molded article from a material injected into the injection molding machine. The controller performs the first diagnosis processing and the second diagnosis processing with the material in the injection molding machine.

(Clause 12) The injection molding machine according to any one of Clauses 1 to 11 includes at least one of a second sensor and a third sensor. The second sensor is a sensor configured to detect data of the first component but not to detect data of the second component. The third sensor is a sensor configured to detect data of the second component but not to detect data of the first component.

(Clause 13) In the injection molding machine according to any one of Clauses 1 to 12, the first data and the second data are both waveform data. The controller converts the first data and the second data into data in a frequency domain and performs the first diagnosis processing and the second diagnosis processing based on the data in the frequency domain.

(Clause 14) In the injection molding machine according to any one of Clauses 1 to 13, the controller performs the first diagnosis processing by inputting the first data into a first model that has been machine-trained and performs the second diagnosis processing by inputting the second data into a second model that has been machine-trained.

(Clause 15) In a method of diagnosing an injection molding machine, the injection molding machine includes a first component, a second component, and a first sensor that detects first data of the first component and second data of the second component. A mode of the injection molding machine includes a first mode in which the first component is driven but the second component is not driven and a second mode in which the second component is driven but the first component is not driven. The method includes performing first diagnosis processing including at least one of abnormality detection and lifetime prediction of the first component based on the first data detected in the first mode. The method includes performing second diagnosis processing including at least one of abnormality detection and lifetime prediction of the second component based on the second data detected in the second mode.

In the embodiments and the modification described above, combination as appropriate of features described in the embodiments, including combination not mentioned in the specification, is originally intended so long as there is no inconvenience or inconsistency.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An injection molding machine comprising:
a first component;
a second component different from the first component;
a controller configured to drive the first component and the second component; and
a first sensor configured to detect first data of the first component and second data of the second component, wherein
the controller is configured to operate the injection molding machine using one of a plurality of modes including a first mode and a second mode,
the first mode is a mode in which the first component is driven but the second component is not driven,
the second mode is a mode in which the second component is driven but the first component is not driven, and
the controller being further configured to:
perform first diagnosis processing including at least one of abnormality detection and lifetime prediction of the first component based on the first data detected in the first mode, and
perform second diagnosis processing including at least one of abnormality detection and lifetime prediction of the second component based on the second data detected in the second mode.

2. The injection molding machine according to claim 1, comprising:
a first component group including the first component and a third component; and
a second component group including the second component and a fourth component, wherein
the first mode is a mode in which the third component is used but the fourth component is not used,
the second mode is a mode in which the fourth component is used but the third component is not used,
the first diagnosis processing includes at least one of abnormality detection and lifetime prediction of the first component group, and
the second diagnosis processing includes at least one of abnormality detection and lifetime prediction of the second component group.

3. The injection molding machine according to claim 2, comprising a screw that rotates and is movable in a prescribed direction, wherein
the first mode is an injection mode in which the screw is moved in the prescribed direction,
the second mode is a plasticization mode in which the screw is rotated,
the first component group includes
a ball screw,
a ball screw nut attached to the ball screw,
a first bearing that rotatably supports the ball screw,
a first motor, and
a first timing belt that transmits motive power from the first motor to the ball screw,
with rotation of the ball screw, the ball screw nut moves the screw in the prescribed direction, and
the second component group includes
a second bearing that rotatably supports the screw,
a second motor, and
a second timing belt that transmits motive power from the second motor to the screw.

4. The injection molding machine according to claim 3, wherein
the first component group further includes a linear guide that guides movement of the screw in the prescribed direction.

5. The injection molding machine according to claim 3, wherein the second component group further includes a reduction gear of the second motor.

6. The injection molding machine according to claim 3, wherein the first sensor is attached to the ball screw nut.

7. The injection molding machine according to claim 1, wherein the first sensor detects vibration of the first component and vibration of the second component.

8. The injection molding machine according to claim 1, wherein the plurality of modes include a deactivation mode in which all components of the injection molding machine are deactivated, and the controller performs the first diagnosis processing based on the first data detected in the first mode and deactivation data detected by the first sensor in the deactivation mode, and performs the second diagnosis processing based on the second data detected in the second mode and the deactivation data.

9. The injection molding machine according to claim 1, wherein the plurality of modes include a maintenance mode and a molding mode, the injection molding machine producing a molded article in the molding mode, and the controller performs the first diagnosis processing and the second diagnosis processing during the maintenance mode.

10. The injection molding machine according to claim 1, wherein the injection molding machine manufactures a molded article from a material injected into the injection molding machine, wherein the controller performs the first diagnosis processing and the second diagnosis processing with the material not having been introduced in the injection molding machine.

11. The injection molding machine according to claim 1, wherein the injection molding machine manufactures a molded article from a material injected into the injection molding machine, wherein the controller performs the first diagnosis processing and the second diagnosis processing with the material in the injection molding machine.

12. The injection molding machine according to claim 1, comprising at least one of a second sensor and a third sensor, wherein the second sensor is a sensor configured to detect data of the first component but not to detect data of the second component, and the third sensor is a sensor configured to detect data of the second component but not to detect data of the first component.

13. The injection molding machine according to claim 1, wherein the first data and the second data are both waveform data, and the controller converts the first data and the second data into data in a frequency domain and performs the first diagnosis processing and the second diagnosis processing based on the data in the frequency domain.

14. The injection molding machine according to claim 1, wherein the controller performs the first diagnosis processing by inputting the first data into a first model that has been machine-trained, and performs the second diagnosis processing by inputting the second data into a second model that has been machine-trained.

15. A method of diagnosing an injection molding machine, the injection molding machine including a first component, a second component different from the first component, and a first sensor that is configured to detect first data of the first component and second data of the second component, a mode of the injection molding machine including a first mode in which the first component is driven but the second component is not driven and a second mode in which the second component is driven but the first component is not driven, the method comprising:

performing first diagnosis processing including at least one of abnormality detection and lifetime prediction of the first component based on the first data detected in the first mode; and performing second diagnosis processing including at least one of abnormality detection and lifetime prediction of the second component based on the second data detected in the second mode.

* * * * *